US009070171B2

(12) United States Patent  
Guo et al.

(10) Patent No.: US 9,070,171 B2
(45) Date of Patent: *Jun. 30, 2015

(54) SYSTEM AND METHOD FOR PROVIDING AUTOMATED CLOTHING FASHION RECOMMENDATIONS

(71) Applicant: Atelier CAAAW, Inc., Palo Alto, CA (US)

(72) Inventors: Cindy Guo, Palo Alto, CA (US); Jiajing Peng, Palo Alto, CA (US); Yibo Zhu, Alamo, CA (US); Annie Wang, Los Altos, CA (US); Wencen Zou, Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/476,984

(22) Filed: Sep. 4, 2014

(65) Prior Publication Data

US 2014/0379426 A1   Dec. 25, 2014

(51) Int. Cl.
| | |
|---|---|
| *G06Q 50/00* | (2012.01) |
| *G06Q 30/06* | (2012.01) |
| *H04N 1/00* | (2006.01) |
| *G06T 11/60* | (2006.01) |

(52) U.S. Cl.
CPC ............ *G06Q 50/01* (2013.01); *G06Q 30/0631* (2013.01); *H04N 1/00185* (2013.01); *H04N 1/00244* (2013.01); *G06T 11/60* (2013.01)

(58) Field of Classification Search
CPC .............. G06Q 50/01; G06Q 30/0631; H04N 1/00185; H04N 1/00244; G06T 11/60
See application file for complete search history.

(56) References Cited

U.S. PATENT DOCUMENTS

| 7,089,216 B2 * | 8/2006 | Van Overveld ................. 706/12 |
| 7,398,231 B2 * | 7/2008 | Wan et al. .................... 705/26.7 |
| 7,714,912 B2 * | 5/2010 | Faisman et al. ............... 348/239 |
| 8,095,432 B1 * | 1/2012 | Berman et al. ............... 705/26.7 |
| 8,103,551 B2 * | 1/2012 | Saul et al. .................... 705/26.1 |

(Continued)

FOREIGN PATENT DOCUMENTS

KR    20070088066 A  *  2/2006  ............. G06Q 50/10

OTHER PUBLICATIONS

Pan, Joann. "5 Fashion Apps to Digitize Your Closet." http://mashable.com/2012/07/13/closet-management-apps/. Jul. 13, 2012.*

(Continued)

*Primary Examiner* — Amanda Abrahamson
(74) *Attorney, Agent, or Firm* — Stephen E. Zweig

(57) ABSTRACT

A client-server social-network for providing automated clothing suggestions. Fashion interested users form social networks, upload records of their respective wardrobes and fashion preferences, and display their wardrobe items and outfits other members of the network, often displaying entire outfits using customizable virtual mannequins. The social network members can evaluate the fashion merits of both their outfits and their friend's outfits, and the system will further store data pertaining to the social network group's fashion assessments. The system may also make statistical inferences as to what types of clothing may be favored and disfavored by the user's social network group, and present these recommendations to the user. Other factors, such as weather, event type, and user's recent history of wearing various wardrobe items can also be considered. The system can additionally assist in shopping and gift giving, provide fashion related games, spot fashion trends, and provide advanced data for fashion suppliers.

8 Claims, 10 Drawing Sheets

(56) References Cited

U.S. PATENT DOCUMENTS

| | | | |
|---|---|---|---|
| 8,260,684 B2 * | 9/2012 | Flusser et al. | 705/26.7 |
| 2007/0225859 A1 * | 9/2007 | Kolesnychenko et al. | 700/216 |
| 2008/0126962 A1 * | 5/2008 | Cook | 715/764 |
| 2009/0037292 A1 * | 2/2009 | Panjwani | 705/27 |
| 2010/0191770 A1 * | 7/2010 | Cho et al. | 707/783 |
| 2013/0151382 A1 * | 6/2013 | Fuller | 705/27.2 |
| 2014/0149213 A1 * | 5/2014 | Fallatah | 705/14.53 |
| 2014/0279289 A1 * | 9/2014 | Steermann | 705/27.2 |

OTHER PUBLICATIONS

Closet Couture Brings the Runway to Your Closet: Solves the age-old problem of having nothing to wear. Anonymous. PR Newswire [New York] Sep. 11, 2008.*

* cited by examiner

SYSTEM AND METHOD FOR PROVIDING AUTOMATED CLOTHING FASHION RECOMMENDATIONS

BACKGROUND OF THE INVENTION

1. Field of the Invention

This invention is in the field of automated clothing and fashion recommendation software 2. Description of the Related Art Fashion—choice of what types of clothing to wear, and what not to wear, is extremely important in our society and indeed in most societies throughout time. An individual's choice of clothing allows others to almost instantly determine an individual's social status, outlook on life, and identification with certain socially important groups. Clothing choices are particularly important to young adults, who often spend much time and energy trying to both establish their individual uniqueness, while at the same time trying to also show what social group and values the young adult identifies with. The consequences of making wrong clothing choices for a given event and situation can often be very distressing.

As a result, the fashion industry is a very large industry, employing over 4 million people in the US alone, and in the US about 250 billion dollars a year are spent on fashion purchases.

Some individuals may be blessed with a high innate sense of fashion and style. However many other individuals may have less innate fashion sense or confidence, but still may wish to dress well for various occasions. As a result, numerous fashion magazines and websites exist, and fashion is often a frequent topic of discussion among friends. Further, with the proliferation of smartphone technology, various types of fashion "apps" are now available for download.

For example, a search for "fashion" apps on the Apple App store shows that various applications are available, including "Social Girl" by Crowdstar Inc., "Fashion Design World", by nanobitssoftware.com, "Kim Kardashian Hollywood", by Glu Games, Inc., "Forever 21", by Forever 21, Inc., and others. However such games are often more fantasy oriented, and less oriented towards helping to solve practical problems of an individual should actually wear, with their existing wardrobe, in a real world environment.

BRIEF SUMMARY OF THE INVENTION

The invention is based, in part, on the insight that what is needed is a practical social network based clothing recommendation system. This system should be based on the user's actual clothing wardrobe, group of real life friends (real-life social network group), and real-life environment, and try to optimize among these various constraints to provide high quality fashion advice, and specific recommendations as to what to wear on any given day or occasion.

In some embodiments, the invention may be a client-server social-network type system and method for providing automated clothing suggestions. Here at least one Internet server, configured with the invention's fashion social network software, will interact with various fashion interested users and create various social network groups. Within each social network group, the various users will typically connected because they are friends (or friends of friends), and also because they share certain fashion values in common. That is, unlike prior social networks, group members will typically share common fashion ideals. Within each group, members will typically be encouraged to pick friends who share similar tastes in fashion. The users will typically interact with the server using their camera equipped smartphones, or other computerized devices.

The server's fashion social network software will further be configured to store detailed records of each user's wardrobe, and for each wardrobe item will often store a description of the wardrobe item type, style, color, designer, material, occasion suitability, weather suitability user preference, history of being worn by the user, and the like. Users will additionally be able to combine various wardrobe items into outfits composed of multiple wardrobe items, and also visualize these individual wardrobe items and outfits by use of virtual mannequins and the like. Users will also be able to share their wardrobe items, outfits, and virtual mannequins with other users.

The server's fashion social network software will additionally be configured to allow other members of a user's social network group to evaluate their own wardrobe items and outfits, as well as wardrobe items and outfits belonging to their friends, and friends of friends, and to draw statistical inferences as to what types of clothing are favored and disfavored by that group. These statistical inferences can then be used by the invention's scoring algorithm to produce recommendations as to what items and outfits a user should wear. Here the scoring algorithm may, for example, weigh various factors as to the user's own preferences, how recently the user's various wardrobe items were last worn, and the user's social network group fashion inclinations. The scoring algorithm will then recommend clothing choices that are compatible with these various factors. In more advanced embodiments, the system's scoring algorithm may additionally factor in other variables, such as the user's location and the weather at this location, weather, type occasion or event (which may be based on calendar schedules), and the fashion preferences of social network users outside of the user's group as well.

In addition to making "what to wear" clothing recommendations, the system can additionally assist in making shopping or gift recommendations, as well as to provide various fashion related games, discussion boards, and interface various clothing suppliers to provide more advanced fashion trend and analysis services to the clothing suppliers. Indeed, the system could be a valuable research tool for the fashion industry, and at least some of the system operating expenses could be paid by providing such research tools to the fashion industry.

BRIEF DESCRIPTION OF THE DRAWINGS

In FIG. 3, the user is also taking an image of their own face and uploading this image to the server database, so that their virtual mannequin will have a face similar to the user's own face. The user may also upload customization data for other aspects of the virtual mannequin (e.g. height, weight, various body dimensions) as well.

DETAILED DESCRIPTION OF THE INVENTION

Figure 1:
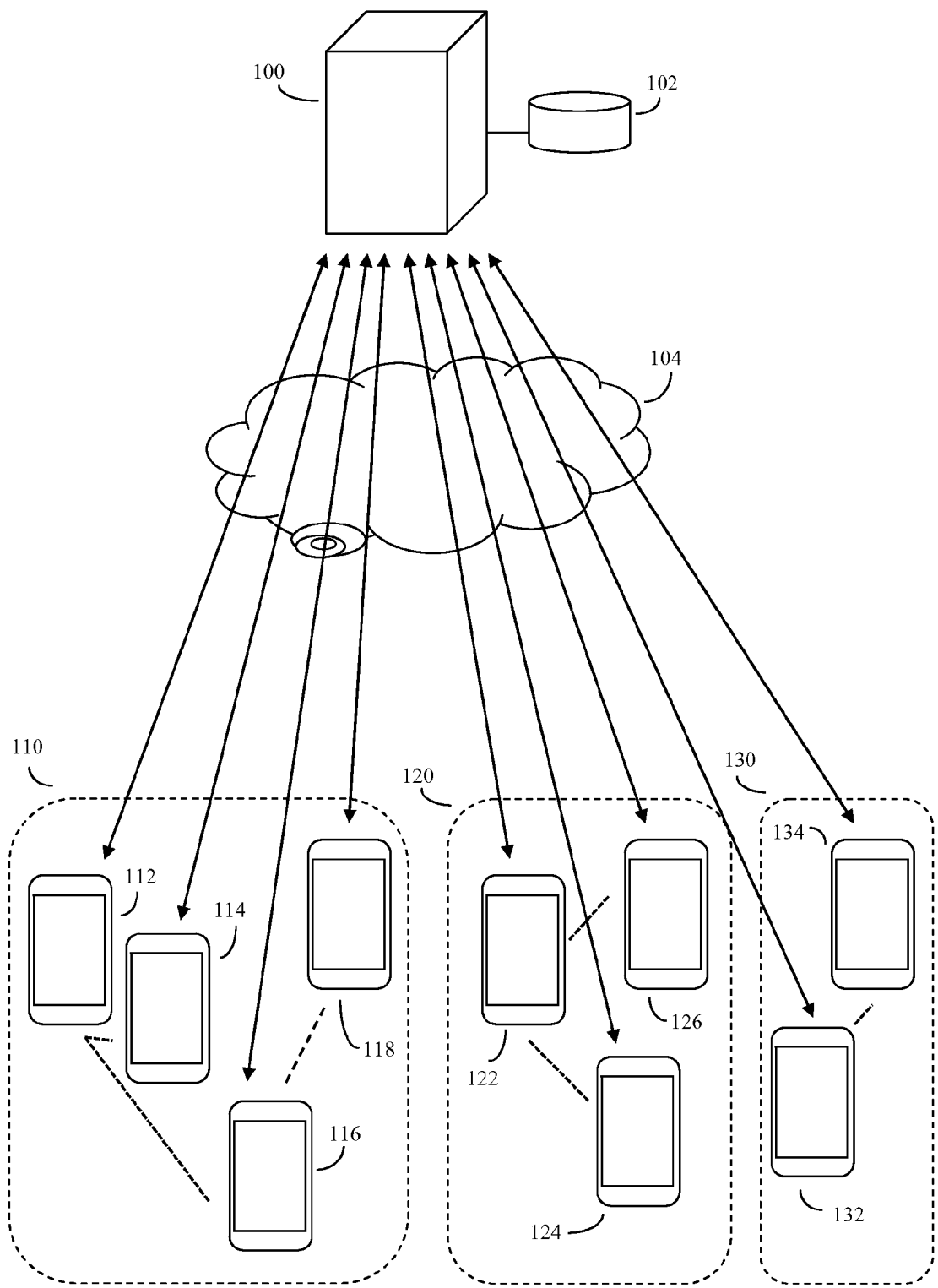
FIG. 1 shows an overview of the client-server structure of the invention's automated clothing suggestion system. Typically at least one or more Internet servers are configured to implement a social network for a plurality of users operating a variety of different client computerized devices (often Smartphones, tablet computers and the like). The typical user will often be a young adult, interested in clothing and fashion styles. The typical user will often have a desire to confirm that their choice of wardrobe items and clothing outfits conforms to styles for their particular social group of friends, friends of friends, and the like. Here some of these various social groups of friends and friends of friends are shown.

FIG. 1 shows an overview of the client-server structure of the automated clothing suggestion system. Typically at least one or more Internet servers (100) are configured to implement a social network with a plurality of users running a plurality of user client computerized devices (often smartphones, tablet computers and the like) (112 ... 118, 122 ... 126, and 132 ... 135).

The typical user will be interested in clothing and fashion styles, and will often have a desire to confirm that their choice of wardrobe items and clothing outfits conforms to styles for their particular social group of friends, friends of friends, and the like. Here some of these various social groups of friends and friends of friends are shown. For example, group (110) may generally consist of friends who mostly are $8^{th}$ grade students at school "a", group (120) may generally consist of friends who mostly are $9^{th}$ grade students at nearby school "b", and group (130) may consist of friends who mostly are $10^{th}$ grade students at different school "c", and so on.

Put alternatively, in some embodiments the invention may be client-server social-network system and method for providing automated clothing suggestions. This system and method will generally comprise using at least one server (100). This server will typically comprise at least one processor (often of the popular ARM, x86, MIPS, PowerPC, or other processor family), memory, operating system and often web server software, and fashion social network software. This invention will typically be implemented using this fashion social network software. The fashion social network software itself may often be implemented using various LAMP stack software, such as Linux, Apache web servers, MySQL (or MariaDB, MongoDB, etc.) type database software, and programming languages such as PHP (or Perl, Python, etc.) and the like, but other types of software from other suppliers may also be used.

The server (100) will also usually have a network connection to the internet (104), and the fashion social network software, when running under the control of at least one server processor, will automatically provide the framework for a fashion social network. This fashion social network will comprise a plurality of users (here exemplified by their client computerized devices (112 . . . 118, 122 . . . 126, and 132 . . . 134), as well as a database (102). This database (102) will typically be configured to store, on a per user basis, user clothing information, user fashion preferences, user social network linkages, and social network fashion preferences. Users will typically form groups where group members typically are related by a "friends" or "friends of friends" basis, and due to the fashion orientation of the system, groups will be encouraged to select primarily members with similar fashion taste. Here, for example, a group may optionally require new potential members to answer a fashion quiz (either provided by the system, or provided by the members themselves) to help insure similar fashion interests.

Groups may thus have fashion themes, and one user may be a member of more than one group on this fashion theme basis. The social network as a whole will thus comprise multiple groups, such as (110), (120), and (130). Certain "super groups" where users may not all have a "friends" or "friends of friends" relationship, but may have a common fashion sense or interest in common fashion themes, may also be established.

Figure 2:
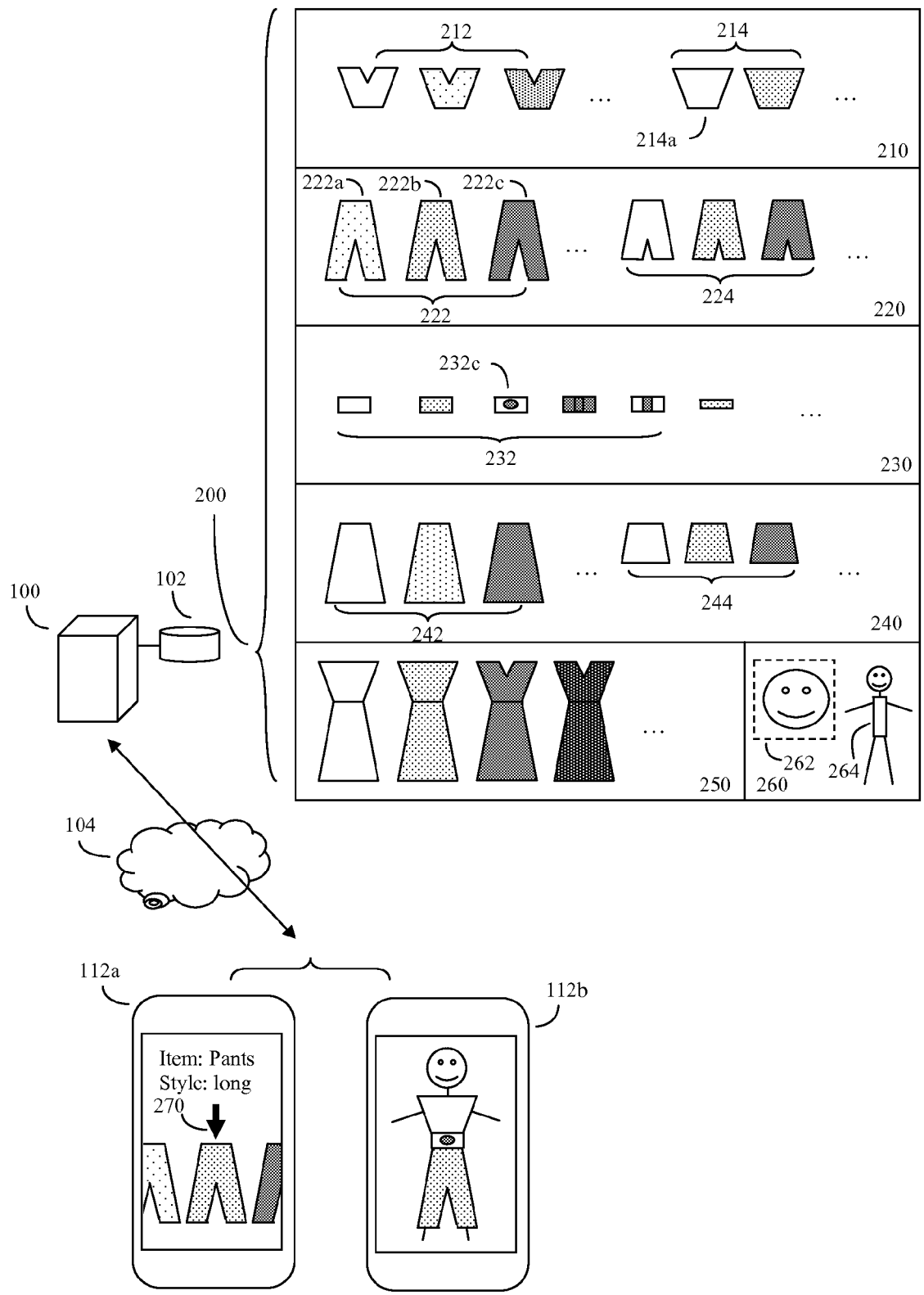
FIG. 2 shows a graphic depiction of some of the clothing data and data structures that can be stored in the Internet server's database. Here, for each user, the server's database will store data and images for a plurality of wardrobe items, often indexed by item type (e.g. dresses, skirts, pants, belts), item style (e.g. long skirts, short skirts, long pants, short pants), item color, item image, item history information (e.g. when and where purchased, item bar codes or identification numbers, and the like) and other data to be discussed. The server database can also contain information to construct at least one virtual 2-dimension or 3-dimensional mannequin, such as at least one image of the virtual mannequin's face, user body dimensions, and the like. The user(s) can use their computerized devices to access the server, send and receive data, and scroll through the various wardrobe items and receive recommendations, and also view outfits (of multiple wardrobe items) on their virtual mannequin(s).

Some of the user clothing information is shown in more detail in FIG. 2. This user clothing information will comprise various user wardrobe items (210, 220, 230, 240, 250) that the user presently owns or has access to, such as (for girls) blouses, pants, belts, skirts, dresses, and the like. Each user wardrobe item will further comprise item type (e.g. blouses, pants, belts, skirts, dresses, and the like), item colors, item style(s) (e.g. V-neck blouses (212), non-V-neck blouses (214), long pants (222), short pants (224), thick belts (232), long skirts (242), short skirts (244) and the like. The database may also contain item images (e.g. computer format images or drawings of each item), and other item information such as item history information, item weather suitability, item occasion suitability, user preference for the item, social group preference for the item, and the like.

According to the system and method, at least one server (100) will be further configured to receive information pertaining to any given user's clothing information (see FIG. 3 for more detail), fashion preferences, and user friend information (e.g. the friends of any given user) from the user's client computerized device. The client computerized devices, exemplified by devices (112 . . . 118, 122 . . . 126, and 132 . . . 134) in FIG. 1 and elsewhere will generally themselves comprise at least one processor, memory, and a display. The client computerized devices will use either specific fashion client software, or a web browser, to send and receive information from server (100). Here desktop computers, laptop computers, tablet computers and smartphones and the like may be used as client computerized devices.

In a preferred embodiment, the client computerized devices may be smartphones or tablet devices that further comprising at least one video camera, a touch sensitive display, and a wireless network connection (e.g. Wi-Fi connection, cellular telephone connection, and the like) that ultimately extends to the Internet. These types of devices may run the fashion client software is a downloadable app. Examples of this later type of devices may be Apple iOS iPhones, Android smartphones, Windows smartphones, and the like.

The server (100) will receive the information from the client computerized device, and store this information (e.g. the user's clothing information, and preferences and friend information) in database (102). The system server (100) and database (102) can then use this user friend information to establish or maintain various social network linkages between the various users, thereby establishing user social networks.

For example, returning to FIG. 1, let us focus on the user of client computerized device (112)). User (112) enters in the information that she has friends (users of devices 114 and 116), and the system can then determine that these three friends must therefore form social group (110). Further, friend (116) in turn is friends with the user of device (118), and thus the user of device (118) also joins social group (110) and has a friends-of-friends relationship with the owner of device (112). Assume at present that all members of the group have generally similar fashion ideals. Other social groups such as (120) and (130) may also form in this manner.

As will be described in more detail, the system and method operates by further receiving, often on a per-user basis, social network fashion preferences from the user social network. Here depending upon system settings, these fashion preferences may be restricted to group (110), or may be set to be broader and to pool data from various other social groups (ideally from groups with similar overall fashion values), such as (120) and (130), thereby allowing for larger fashion "super groups" to be formed when this option is desired.

For example, these social network fashion preferences can comprise the preferences of at least one different social network linked contact (e.g. for user 112, this would be the preferences of at least users 114, 116 or 118, and preferably at least several of these) pertaining to at least one user wardrobe item (e.g. at least one of user 112's blouses, pants, belts, skirts, or dresses in FIG. 2), or at least one outfit (e.g. blouse, pants, belt, or dress, or blouse skirt, belt combination, etc.) comprising a variety of different user wardrobe items.

The server (100), at least one server processor, and the server's fashion social network software can use this user clothing information, user fashion preferences (e.g. user 112 can transmit information to the server regarding favorite wardrobe items, preferred styles, and the like), and the social network fashion preferences (e.g. preferences of other social network members) and a scoring algorithm to suggest at least one user wardrobe item, or at least one outfit, for the user to wear.

See for example, FIG. 2, where the user is using her device (112*a*) to perhaps scroll through the user's wardrobe of pants items (220). Here the system is recommending the best pair of pants to wear (here long pants 222*b*) by the arrow (270). (The logic behind this decision is shown in more detail in FIG. 4.) Alternatively the system may recommend an entire wardrobe (combination of pants 222*b*, blouse 214*a*, and belt 232*c*) as shown in FIG. 2 (112*b*).

As will be described in more detail, this scoring algorithm can give higher or lower weights to various user (112) wardrobe items or outfits according various criteria. These can include criteria such as (a function of) the social network fashion preferences (e.g. preferences of at least users 114, 116, 118 in user 112's social group 110), user 112's own fashion preferences, and the item history information (e.g. did user 112 just wear that item or outfit yesterday? if so then give it a lower weight). In other words, the item history information can be the user's history of recently wearing that item or outfit. Usually more recently worn items will be given lower weight to avoid over repetition, but the user may choose to adjust this weighting according to their individual desires (here the system may optionally warn if a choice is overly non-standard).

In operation, server (100) and database (102) will generally further receive information pertaining to an actual wardrobe item or outfit choice of the user. That is, if user (112) accepts the FIG. 2 pants suggestion (270) of pants (222b), user (112), generally prompted by software running on board user (112's) device, will inform the server that these where the pants that the user actually used. Alternatively the user may inform the server that the user ended up wearing some other selection. The server will then store this "actual choice" information in its database (102), and use the user's actual choice as at least part of the user's user fashion preferences in subsequent recommendations.

FIG. 2 also shows a graphic depiction of some of the clothing data and data structures (200) held in the Internet server's database (102). Here, for each user, the server's database (102) will store data and images for a plurality of wardrobe items, often indexed by wardrobe item clothing type (e.g. dresses (250), skirts (240), pants (220), belts (220) and blouses (220)), item style (e.g. long skirts (242), short skirts (244), long pants (222), short pants (224)), item color, item image, and item history information (e.g. when and where purchased or worn, item bar codes or identification numbers, and the like). The server database (102) can also, for each user, contain information (260) to construct a 2-dimensional or 3-dimensional virtual mannequin (264), such as at least one image of the virtual mannequin's face (262). The user(s) can use their computerized devices (e.g. 112) to access the server (100), send and receive data, and scroll through the various wardrobe items (112a) and receive recommendations (270), and also view outfits (of multiple wardrobe items) on the virtual mannequin (112b). In some more advanced embodiments, the virtual mannequin may be animated by the system and may pose, walk down a virtual runway, turn around, etc., and the wardrobe item images will be used as surfaces, skins or textures, on the moving virtual mannequin (often a 3-dimensional moving mannequin), and can be manipulated using standard 3D graphics techniques to realistically show what the clothing would look like under conditions of 3D movement.

Thus for example as shown in FIG. 2 (112a), the user can thus further sort their user various wardrobe items or outfits according to various categories, such as item types (e.g. general type of clothes), item colors (color of clothes), item styles (e.g. long, short, formal, informal, etc.), item history information (name of manufacturer or designer, when last worn, etc.), user fashion preferences (e.g. prefer formal, prefer casual, prefer light colors, prefer dark colors, etc.), and social network fashion preferences (e.g. preferences of at least the members of social group 110 in the case of user 112), and the system can then produce sorted user wardrobe items or sorted user outfits. Images of these various items (e.g. the images of the various long pants in (112b)) can be used to display these sorted user wardrobe items (or sorted user outfits, see 112b) on the relevant client computerized device (e.g. 112).

In particular, in FIG. 2, note that the system can use the client computerized device to display the wardrobe item or outfit on a virtual mannequin. As will be shown in more detail in FIG. 3, the system can also allow the user to upload images (e.g. faces, such as the user's face 304) to the server (100) and use these images (262a) to customize the appearance of the virtual mannequin (262a) to resemble the user. This thus allows the user to make a customized virtual mannequin, and display the user wardrobe items or outfits (often sorted according to the system's scoring algorithm) on the user's client computerized device.

Figure 3:
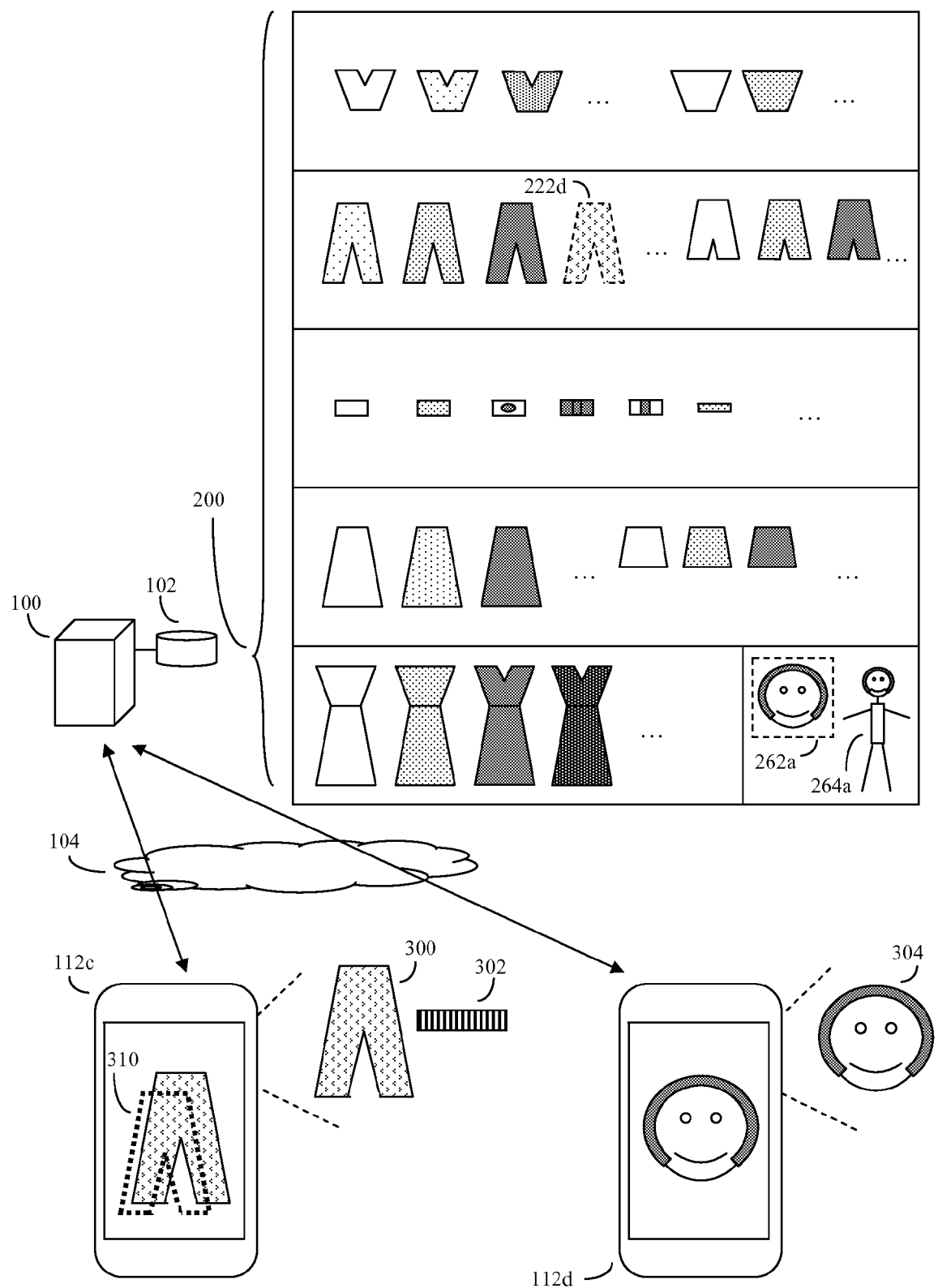
FIG. 3 shows how a user can add additional wardrobe items to their server database, and/or update one or more images (such as images of the face) used for their particular virtual mannequin. Here the user is using a camera on their client computerized device (such as a Smartphone) to either take pictures of a new wardrobe item (long pants) or alternatively scan a bar code or other wardrobe item identification information. This information is then uploaded to the server database.

As previously discussed, FIG. 3 shows how a user can add additional wardrobe items (300) to their server database (102, 200), and/or update one or more images (such as images of the face 262a) used for their particular virtual mannequin (264a). Here the user is using a camera on their client computerized device (112c) (such as a smartphone) to either take pictures of a new wardrobe item (long pants 300) or alternatively scan a bar code (302) or other wardrobe item identification information for this new wardrobe article of clothing. This information is then transmitted by device (112c) over the Internet (104) to the server (100) and uploaded to the server database (102). FIG. 3 also shows an example where the user is also taking an image of their own face (304) and uploading this image to the server database (102, 200) so that the virtual mannequin (264a) will have a face (262a) similar to the user's own face. The user may also upload customization data for other aspects of the virtual mannequin (e.g. height, weight, various body dimensions) as well.

In some cases, the user may wish to show their virtual mannequin or their various wardrobe items against a customized moving or static background image or video. For example, a user intending to go to a formal event may wish to use a formal event type background image, while a user intending to go to a beach party may wish to use a beach type background image. To do this, the system can also be configured to allow the user to further select or upload background images, video, (or a link to these images or dynamic background) to the server database (102) for the virtual mannequin to pose against. Alternatively the system may provide various standard backgrounds to use. Once the background is chosen, the system can then display the items of interest (e.g. sorted user wardrobe items or sorted user outfits) on their customized virtual mannequin against these various user chosen background images or dynamic background.

Again, as previously discussed in FIG. 3, in order to let the system (e.g. server 100, database 102) know what specific wardrobe items the user has (or wants) and what these items look like, the user has various options. In one option, the user can use their client computerized device (e.g. 112) to photograph or otherwise scan optical codes (302) (e.g. 1D or 2D bar codes), catalog numbers, or other information (e.g. name of item, manufacturer), RFID tag data, etc. pertaining to the wardrobe item of interest, and upload this information. The server can then use this uploaded information (e.g. optical bar codes, catalog numbers, and the like to then retrieve images and other information regarding the item from another database, such as a manufacturer or catalog database. For such purposes (e.g. scanning optical bar codes), it is useful if the client computerized device (112) has at least one software controlled camera. If so, then the user can simply use the client computerized device's camera to photograph the appropriate bar codes, wardrobe item itself, or other information, and upload the images to the server (100).

In the event that the user wishes to simply take a photograph of the wardrobe item for uploading, various methods may be used to help ensure that good quality images result. For example, in a common situation where client computerized device has at least one camera and a display screen (e.g. a smartphone or tablet computer), then the device software may be configured to inquire as to what type of wardrobe item is being photographed. The device can then use this information to, for example, generate a template of that particular item on the display screen, as well as to instruct the user to use this template to as a photographic guide. This example is shown in FIG. 3 (112c). Here the system has generated a photographic guide or template of the long pants (300) that the user wishes to photograph and add to her wardrobe database (102, 200). The user can use this template while photographing the items, generally moving the camera to fill the screen image of the template with the image of the clothing item. The system can then only use the portions of the image that fall within the template to generate the image of the wardrobe item. Here the uploaded photograph of the long pants will be added to the database as (222d).

Figure 4:
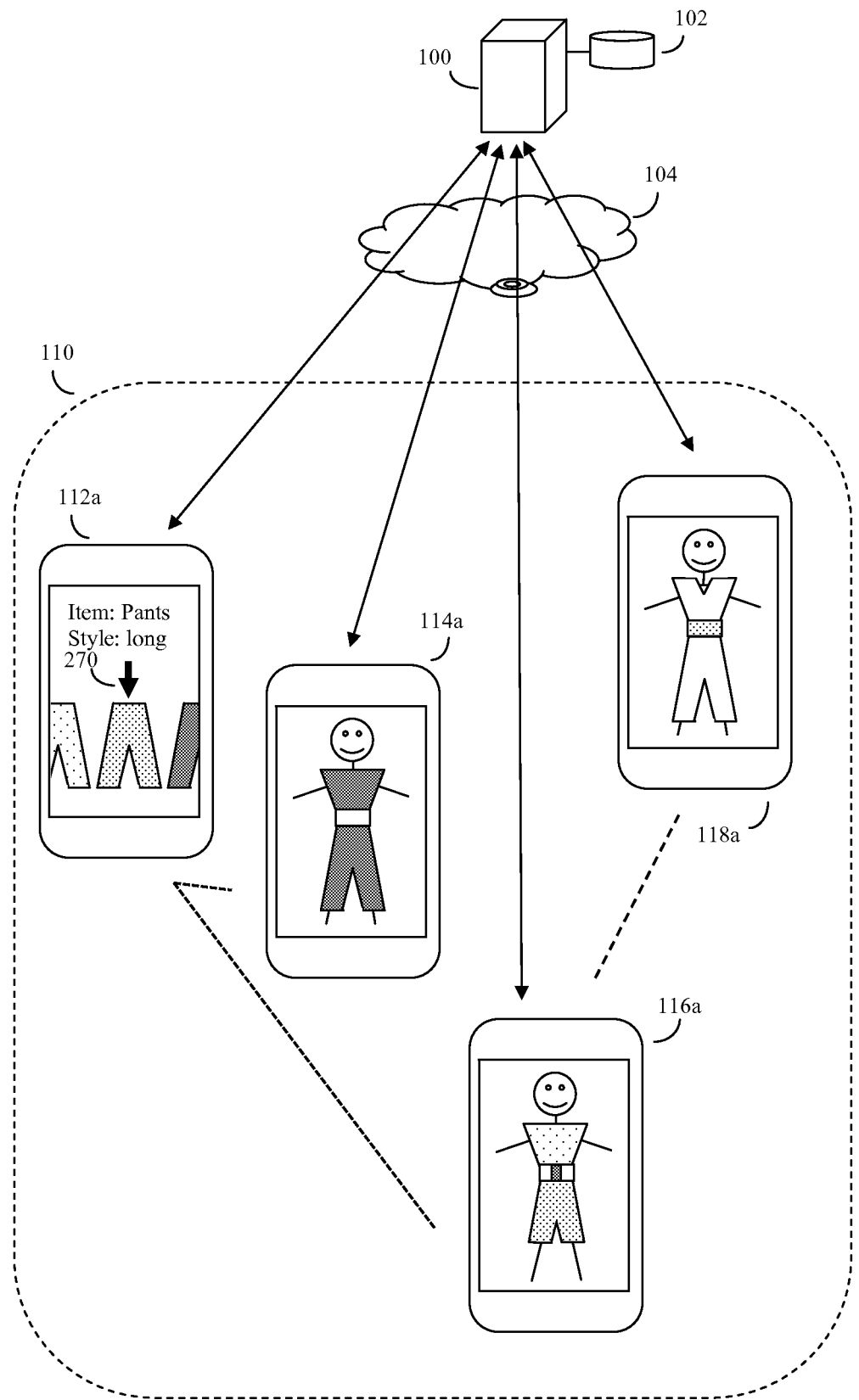
FIG. 4 shows how various members of a particular social group of friends and friends of friends can enter in their particular favored wardrobe items or outfits that they have previously worn, are presently wearing or are planning to wear, and send this to the server. The server can use this information, along with information pertaining to a particular user's wardrobe and particular user fashion preferences, to suggest items of clothing (here long light gray pants) that generally fit in with the preferences of other members of the user's social group, yet may not be identical to the other outfits.

FIG. 4 shows how various members of a particular social group of friends and friends of friends (110) can enter in their particular favored wardrobe items or outfits that they may be wearing or planning to wear (here 114a, 116a, and 118a), and send this to the server (100). The server can use this information, along with information pertaining to a particular user's wardrobe (e.g. user 112's wardrobe, previously shown in FIGS. 2 and 3) and particular user fashion preferences, to suggest items of clothing (here long light gray pants 270) that generally fit in with the preferences of other members of the user's social group (e.g. all like pants, with a general preference for long pants), yet may not be identical to the other outfits (e.g. the color of the recommended pants (270) is light gray, midway between the long dark gray pants worn by user (114a), and the long white pants worn by user 118a).

As previously discussed, in a preferred embodiment, the system will further be configured to receive information pertaining to the various users' actual daily choice of wardrobe items and outfits (e.g. what the users actually end up wearing). Here for example, the system can use the various client computerized devices to prompt for this information, or otherwise encourage the users to enter in their final choices. These final choices can then be stored in database (102). The system can then use this information (pertaining to daily user choice of wardrobe items and outfits) to construct a history of the user's daily choices in what they actually wear. This information can then be used for various purposes, including using this history in the previously discussed scoring algorithm. One immediate use for this type of data is to help prevent two different users from showing up at the same event wearing wardrobe items or outfits that are perceived as being "too similar", in other words, a clothing or wardrobe "collision".

Figure 5:
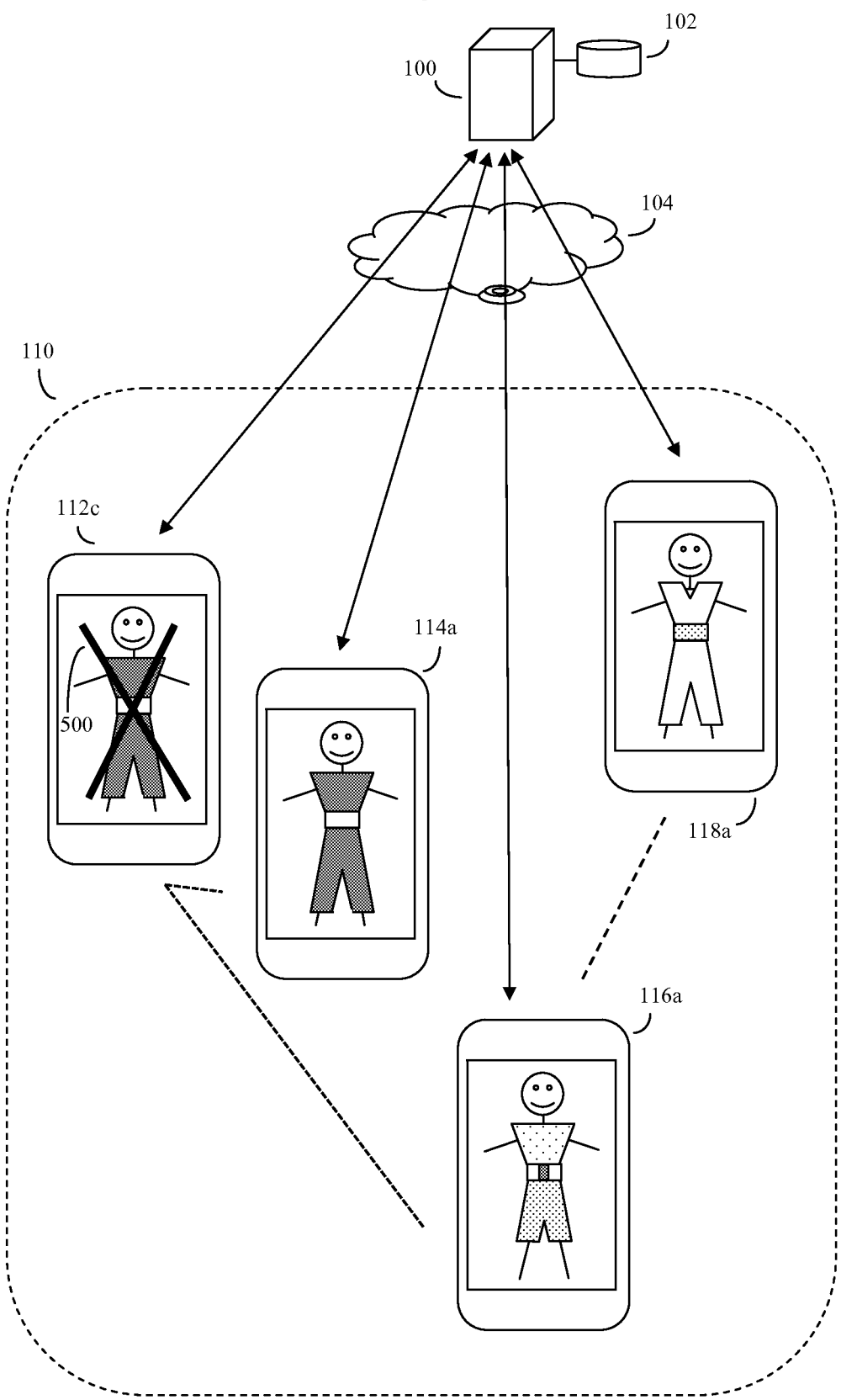
FIG. 5 shows how the system can also help detect wardrobe "collisions" where two members of the system may be planning to attend the same event at the same time, yet do not want to wear identical outfits. Here the system has detected that the user's proposed outfit is identical to an outfit that another member of the same social group (or alternatively any social group in the social network) has previously planned to wear, and is thus warning the user about the likely outfit "collision". By default the system's collision detection algorithms may often operate on a "first to claim an outfit" priority basis, but other priority schemes may also be implemented.

FIG. 5 shows how the system can help detect and prevent wardrobe "collisions", where two members of the system may be planning to attend the same event at the same time, yet do not want to wear identical outfits. Here the system has detected that user (112c)'s proposed outfit (is identical to an outfit earlier chosen by another member (114a) of the same social group (110) (or alternatively any social group in the social network). The system here is warning the user about the likely outfit "collision", by drawing the "X" mark (500) over user (112c)'s proposed outfit (here any type of warning, including audio messages, text messages alternate symbols, etc. may be used). By default the system will often operate on a "first to claim an outfit" basis, but other priority schemes may also be implemented. In theory a "queen bee" type social group member with high status might, upon consent of the other members, be given an overriding priority in her choice of outfits.

This collision detection method can work, for example, by further receiving (at the server 100) the present or reported future locations of the user (e.g. user 112c) and at least some individuals in at least the user's social group (110) or, depending upon the setting, other individuals in other groups in the social network such as, for example, groups (120) and (130). Here for example, the user may inform the system that they are going to their school's Saturday night dance (assume that the school location is on file with the social network).

In this embodiment, the collision detection scheme works by determining if the present or reported future locations of the user and at least some individuals in the user's social group or network, are also planning to be within the same given location criteria (e.g. also going to their school's Saturday night dance). The server (100) can use its at least one processor to determine if either user (112)'s present or reported future locations, as well as at least some individuals in the user's group or social network, are or plan to be at the same location at the same time (e.g. within a given location error criteria, such as matching the location within +/−100 feet of the location, or other error range that can be set by the system or alternatively be adjusted by the users).

Assuming that the system determines that two or more individuals from the same social network plan to be at the same location and place, the server can then perform various additional checks: For example, the system may receive information pertaining to what wardrobe items or outfits that the various individuals (e.g. user (112) and other) are wearing or plan to wear, and determine if the outfits match, or major wardrobe items (e.g. dresses) match, or are the same color or otherwise meet certain preset collision parameters. These preset collision parameters may be often determined by system defaults, (e.g. warn on if both top and bottom wardrobe items are the same, warn if dresses are the same, etc.), or alternatively these preset collision parameters may be modified by the users (e.g. user set to warn if the same belts are being worn). The sever (100) can then provide a collision warning if at least some of the item styles or item colors are either similar or identical, as per the preset collision parameters.

Alternatively or additionally, the system can also give more collision information than just the large "X" (400) shown in FIG. 5. For example, the server can also report more information, such as providing specific wardrobe item data reporting on which and how many of the wardrobe items, item styles, or item colors are in collision between the various users.

Figure 6:
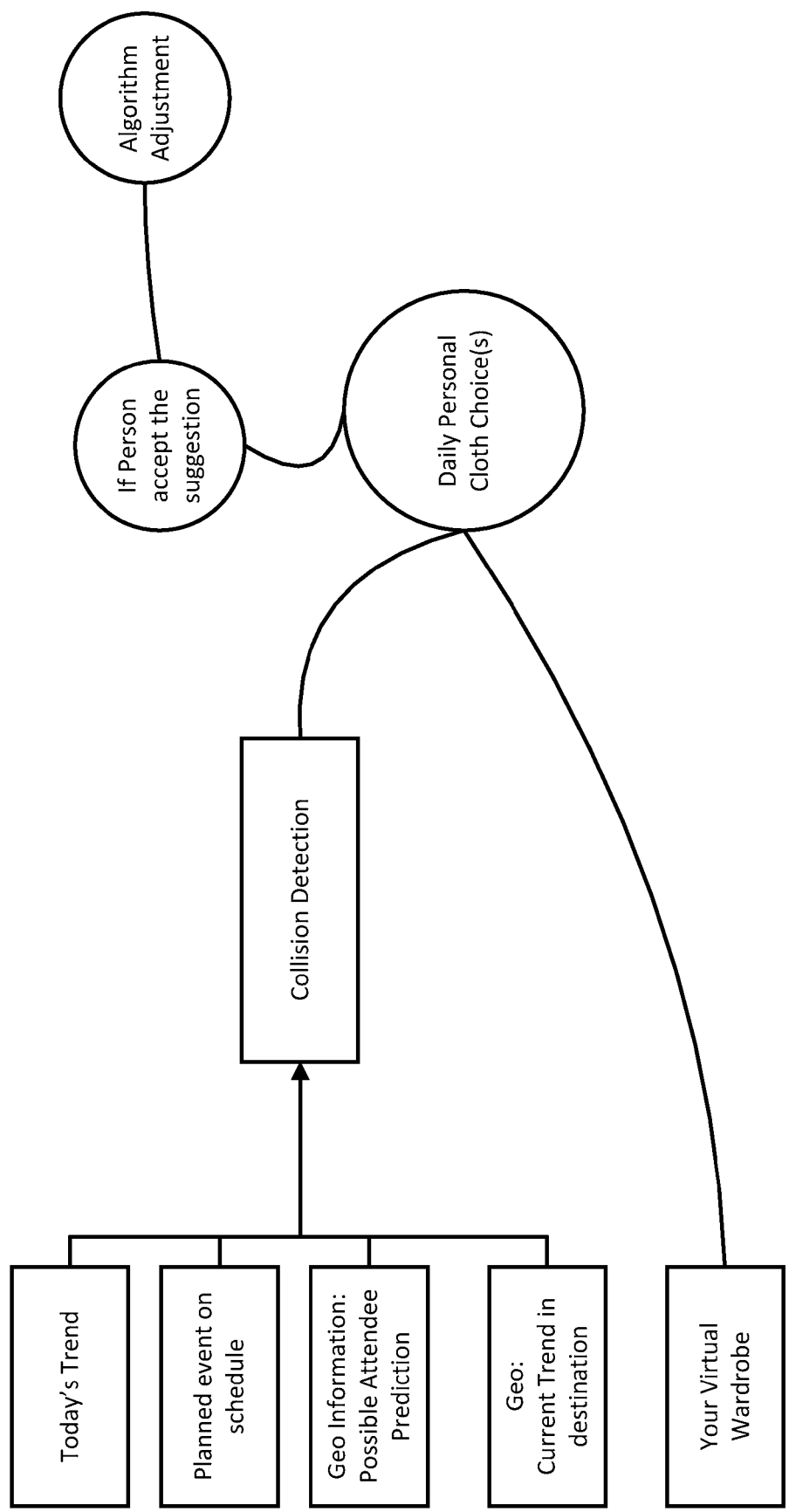
FIG. 6 shows more detail pertaining to the various methods used by the system to prevent clothing "collisions", where more than one user will wear the same outfit or major wardrobe item (such as the same dress) to the same event.

FIG. 6 shows more detail pertaining to the various methods used by the system to prevent clothing "collisions", where more than one user will wear the same outfit or major wardrobe item (such as the same dress) to the same event.

Fashion ranking, advice, and games:

In some embodiments, the system can also be configured to allow members of any given user's social group (e.g. members of group 110), as well as other members of other social network groups (which can be members of different social groups such as 120 and 130) to vote on the fashion sense of the various users/members. Here for example, users can vote on which other users/members have the best fashion sense. Other types voting for other types of fashion ranking schemes can also be used, such as numerically ranking the various user/members fashion sense, voting on the user/member with the worst fashion sense, and so on. The system can then report these voting results, and automatically rank the various members in a particular voting group or poll according to their overall cumulative fashion sense score.

In some embodiments, the system may also run various types of advice exchange forums (message boards, online discussion systems), in which users can write in with fashion questions and observations, and these can in turn be commented on by other users. However because not all comments will be from individuals with equal fashion sense, it may be useful to also configure the system to provide a mechanism by which comments or posts from individuals with a greater level of peer acknowledged fashion sense can be distinguished from comments and posts from individuals with lower levels of peer acknowledged fashion sense.

Here, the previously discussed fashion sense voting or ranking system can be useful for these purposes. In this embodiment, the system can provide an advice exchange forum (message forum, online discussion form) for some or all users (either unrestricted, or on a user group or super group basis). Here the various users may direct questions to, for example, either all users, specific users, or users with a specified overall cumulative fashion preference score. Answers to these questions in turn may be directed to either all users, specific users, or the user who submitted the question. The relative cumulative fashion preference score of either the user submitting the question and/or the user answering the question may also be listed so that the relative merits of the question and answer may also be assessed by other individuals.

In some embodiments, the online discussion system may be further configured to also allow users to rank the quality of answers. For examples, users may vote on the quality of various answers according to various types of quality scores (e.g. like, dislike, 1-5 rating, A-F ratings, and so on). Persons who submit answers that are judged by other users as being of high quality may be given more answer points. The system may even be configured to reward message board participation by awarding prizes to individuals who with a high cumulative number of answer points.

In some embodiments, the system (e.g. server 100) may also be configured to provide various types of fashion games. Here examples of three games: a "shake and compare clothing" game, a "virtual fashion carnival" game, and a "guess what I am wearing" game are presented.

The "shake and compare" game takes advantage of the fact that many users will be using smartphones to access the server, and that most modern smartphones are equipped with accelerometers that can detect shaking Note, however this game can also be implemented by other methods, such as by pushing a button on the client computerized device, as needed or desired by the user(s). Here, various social network users, either within a given social group (110), or between different social groups (e.g. 110, 120, 130) may be prompted to, at a given moment, shake their client computerized devices (smartphones) or push a button on their various client computerized devices. When this happens, at least for those client computerized devices that are presently activated by shaking or button pressing, then the server can then share information pertaining to the wardrobe items that these particular users are presently wearing.

For example, the server (100) can transmit images of the user's virtual mannequins, dressed in the wardrobe items that the users are presently wearing, to the screens of the various activated client computerized devices, and the users can in turn scroll through or otherwise inspect what other users with activated client computerized devices are wearing at any moment in time.

Figure 7:
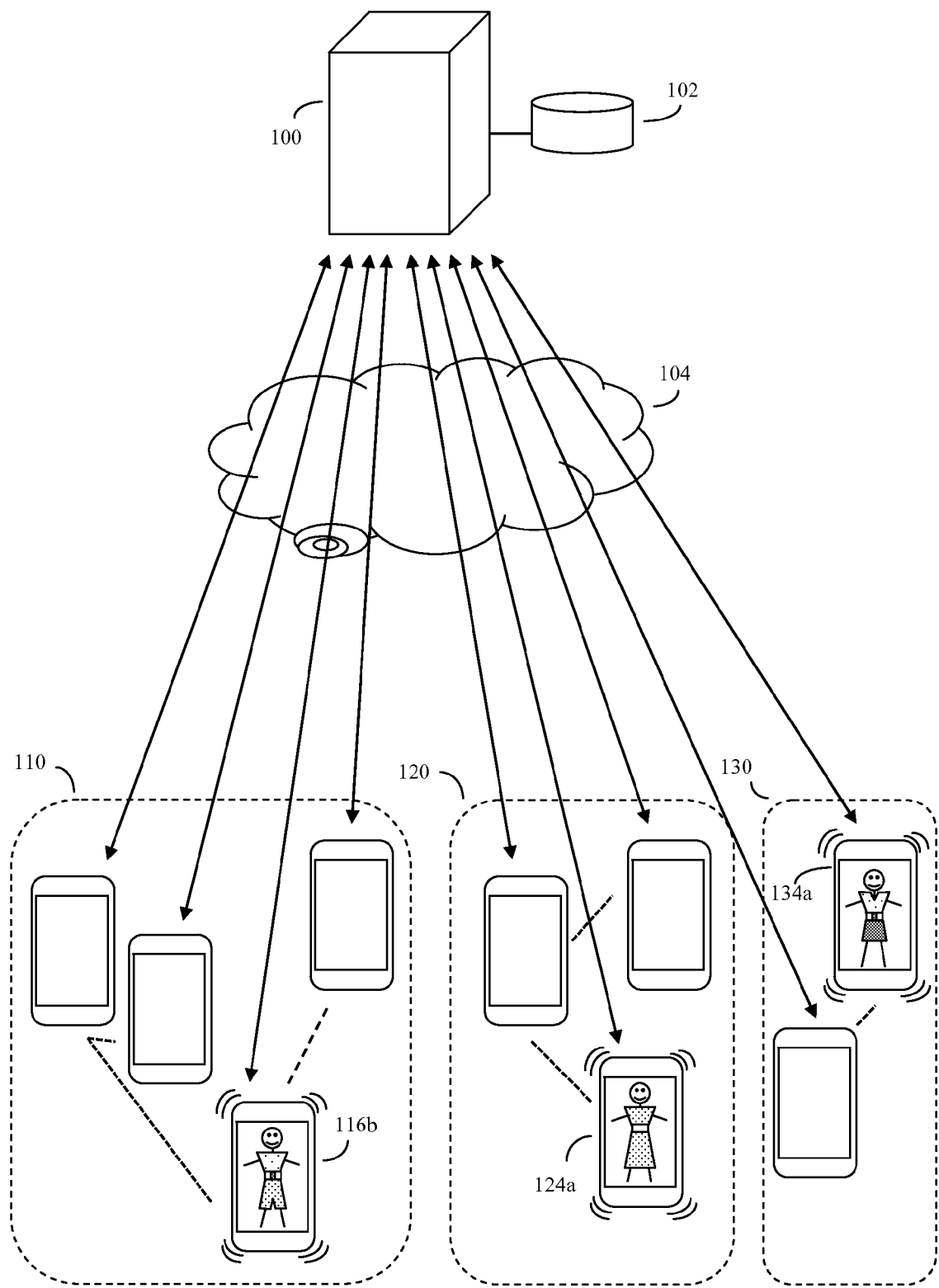
FIG. 7 shows an example of one type of fashion game. Here the server is configured to detect whenever any server user is shaking their computerized device, and then show an image of the user's virtual mannequin wearing the user's present outfit to those other users who are shaking their devices at the same time. In this example, this sharing operates regardless of any social group compartmentalization, and may help one social group find another social group with similar fashion sense. Other game configurations (e.g. only share within a social group, or only within social groups of the same "social group type") may also be implemented.

FIG. 7 shows an example of this "shake and compare" game. As discussed above, server (100) may be configured to detect whenever any social network user is shaking their computerized device (here the users of devices 116a, 124a, and 132a are presently shaking their devices), and then show the user's outfits (here on the various user's virtual mannequins) to the other users who are shaking their devices at the same time. In some game embodiments or settings, this can be done regardless of any social group compartmentalization. Here for example, users (116b) (124a), and (134a), who are normally in different social groups (110), (120), and (130), can nonetheless communicate to at least this limited extent. In other game embodiments or settings, this "shake and compare" game can be configured so that only social network users within a given social network group (e.g. within group 110) or super group can exchange wardrobe information when they simultaneously shake or otherwise activate their devices.

In an alternative "virtual fashion carnival" game, the server (100) (and client computerized devices) can be configured so that the users (often within a social group such as 110) can invite various other social network members (either within the same social group 110 that is providing the virtual fashion carnival, or with members of different social groups or super groups such as 120 and 130 on the same server social network) to exhibit their clothing selections. These clothing selections can be exhibited as either specific user wardrobe items, or user outfits (composed of multiple wardrobe items) often worn by customized virtual mannequins.

The users (fashion carnival presenters) putting on the virtual fashion carnival can then provide access (through server 100) to the virtual fashion carnival to various viewers (e.g. members of the fashion carnival presenter's social network group such as 110, or members of both the presenter's social network group 110 as well as various individuals outside of the fashion carnival presenters social network group, such as members of the fashion super group). Additionally, the server can also be configured to receive fashion rating votes from at least some of the various viewers, ranking the outfits or wardrobe items of the various fashion carnival presenters according to their fashion sense. The system can also be configured to encourage users to conduct such virtual fashion carnivals by, for example, adding these fashion rating votes to the fashion carnival presenter member's overall cumulative fashion sense score.

Figure 8:
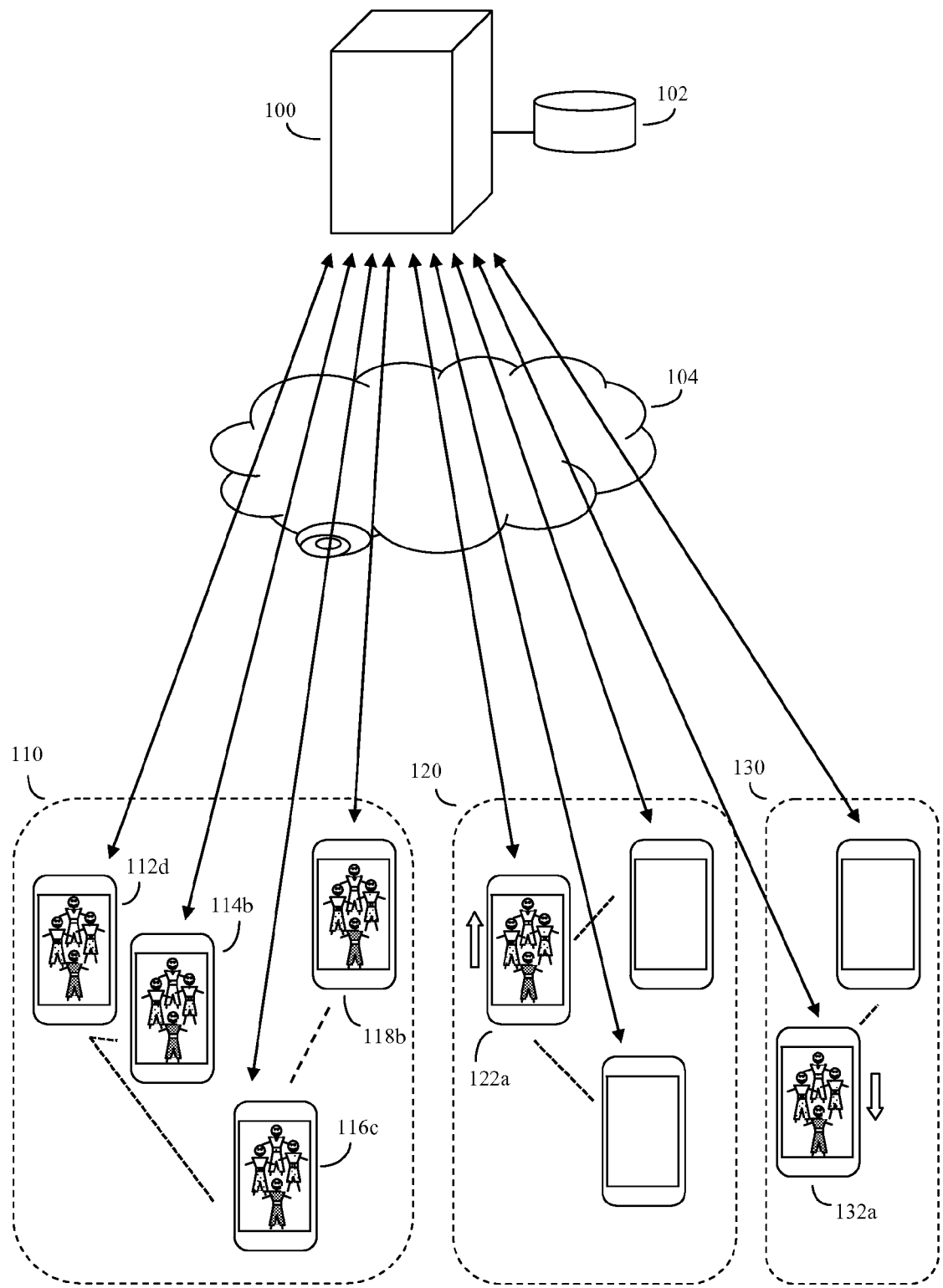
FIG. 8 shows an example of a different type of fashion game—here a "virtual fashion carnival" in which members of a particular social group have arranged to combine their favorite outfits, show outfits (one from each participating user) on screen at the same time (here using the user's various virtual mannequins), and solicit ratings of these outfits. Here, in an attempt to get more objective ratings, the members of this particular social group have elected to solicit ratings from other social groups on the social network.

This virtual fashion carnival is shown in more detail in FIG. 8. Here the members of a particular social group (e.g. group 110 users who control devices 112d, 114b, 116c and 118b) have arranged to show a virtual fashion runway presenting the fashion carnival presenter's favorite outfits, disposed on virtual mannequins, on a show that can be seen by various other individuals. The presenters have also decided to request that the other viewers rate the presenter's outfits. Here the user who controls device 122a, from different social group 120, likes the outfit in front and is voting favorably (up arrow). By contrast the user who controls device 132a, from different social group 130, does not like the outfit in front and is voting unfavorably (down arrow). The server (100) and database memory (102) can keep track of these voting results and assign them to the overall cumulative fashion score of that particular fashion carnival presenter, or otherwise keep track of the voting results.

The system can also implement various other types of fashion games as well. For example, another type of fashion game can be wardrobe item or outfit guessing games. Here those users participating in the fashion guessing game can, for example, guess at what other members of the user's social networks (usually social network group) are wearing. The server (100) and database memory (102) can keep track of these guesses, as what was actually being worn, and report results on the accuracy of these guesses.

Fashion Statistical Reporting Methods:

In some embodiments, the system may be configured to track various fashion trends for either the users, and/or for the fashion industry as well. For example, the system may track various user wardrobe items as a function of time (e.g. what types, styles, and colors are presently favored or disfavored, as well as additional information such as wardrobe item designer or manufacturer name, fabric or other material type, and the like) across multiple users, and report statistics on trends as to what is appearing in various types of user's wardrobes, as well as what various types of users are actually wearing. The statistical data can also be split out by various social network groups, so that for example, if group (110) is starting to favor white short pants as a function of time, while group (130) is starting to favor black long pants as a function of time, the different trends of the different groups may also be identified.

In some embodiments, statistics and fashion trend reporting may be further analyzed by user geographic location, and/or additionally by wardrobe item sales data as well. Here the system may encourage (or require) that the various social network users report their main or "home" geographic location (often the school or university that they attend, home location, or location of work) to server (100) and database (102). Here the server based fashion trend prediction software can be configured to track the various users' fashion preferences, social network fashion preferences, and report on trends in what wardrobe items are owned, worn, or purchased as a function of time.

In some embodiments, the server based fashion trend prediction software can also use fashion sales data (e.g. data from manufacturers, retail stores, chains, catalog stores) pertaining to clothing sales broken down by various categories (such as the user's geographic location) to analyze and predict latest fashion trends. These trends can be reported with respect to wardrobe item types, item colors, item styles, and the like. Because some fashion businesses may be reluctant to share their private sales data with other organizations, in some embodiments the system may be configured to offer a more detailed sales analysis as a premium confidential service to the clothing industry. In this way, funds obtained from the clothing industry may in turn help defray the cost of running the social network system.

Figure 9:
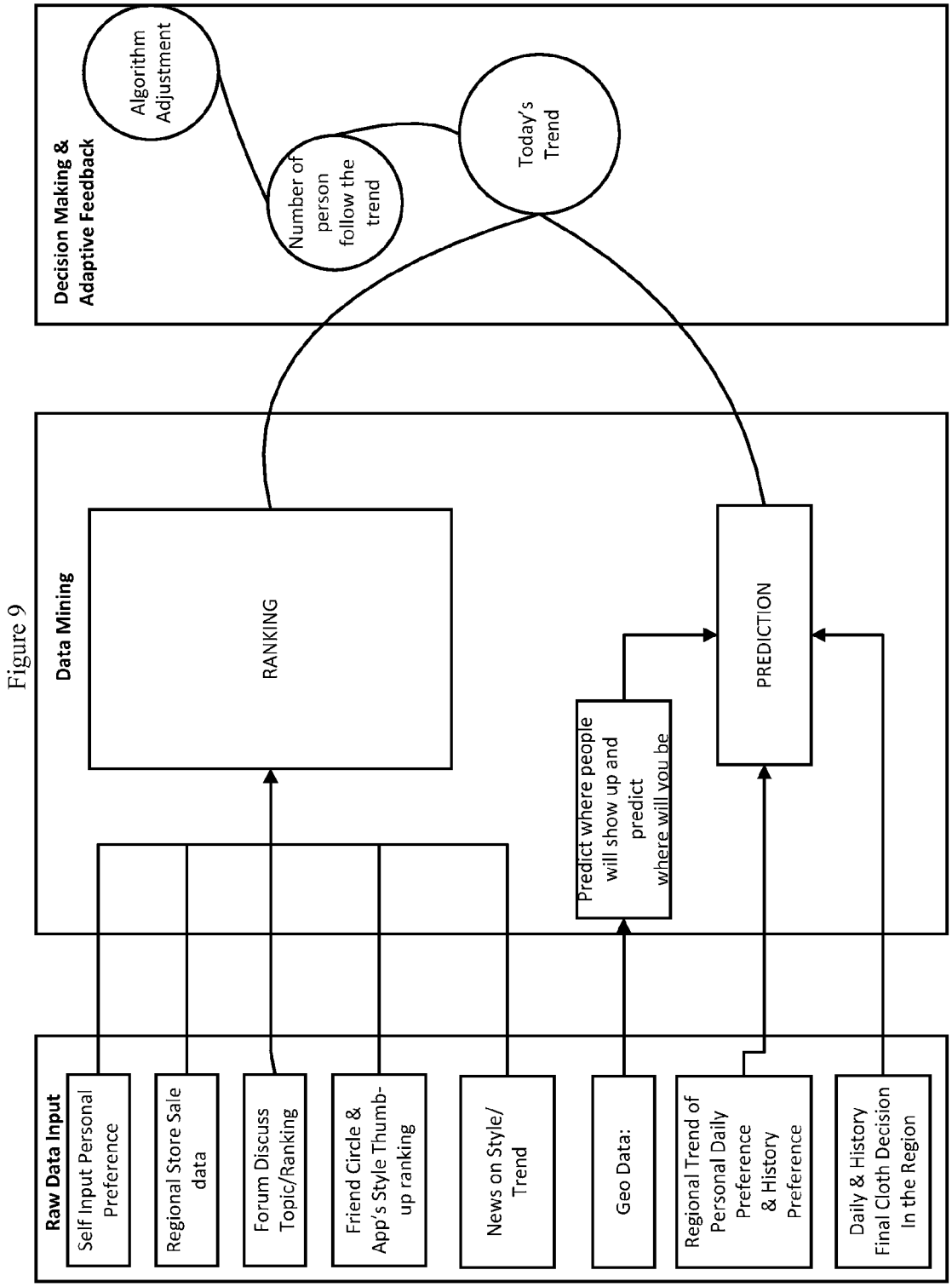
FIG. 9 shows that in some embodiments, the system can use relatively complex methods to automatically (or adaptively) adjust the scoring algorithm, as well as to compute user and social network fashion preferences to better compensate for fashion trends in a given region. These complex methods can also be useful for generating fashion data and analysis for various reports. In this embodiment, the regional clothing style trend prediction methods can integrate data from multiple sources, such as user personal preferences, regional store sales data, forum discussions, social network friend ranking data, news feed data, geographic data, and the history of preferences and daily outfit choices from different users in the same region. The system can then take this data, and automatically compute statistical reports pertaining to the latest fashion trends, such as what types and styles of clothing, in what colors, are becoming more popular.

Other more complex scoring algorithm and trend analysis may also be done. Examples of such more complex methods are shown in FIG. 9. Here, FIG. 9 shows that in some embodiments, the system can automatically (or adaptively) adjust the scoring algorithm(s), compute user fashion preferences, and compute social network fashion preferences to better compensate for fashion trends in a given region, as well as to generate data for various reports. These regional clothing style trend prediction methods can integrate data from multiple sources, such as user personal preferences, regional store sales data, forum discussions, social network friend ranking data, news feed data, geographic data, as well as the history of preferences and daily outfit choices from different users in the same region. The system can then compute statistical data pertaining to the latest fashion trends, such as what types and styles of clothing, in what colors, are becoming more popular.

Additional Methods:

Shopping and gift assistance: In some embodiments the server may be configured to further keep track of potential user clothing purchases (e.g. potential shopping purchases). Here the user(s) can use their respective computerized devices (or other devices, such as by relaying from a clothing sales website) to receive and keep track of the user's potential clothing purchases. Here for example, a user may research a clothing item for sale before actually purchasing it. In general the user potential clothing purchases may be obtained from the shopping user directly, or from least one different social network based contact (e.g. another user shopping for a gift), or by relaying browsing information from a clothing advertiser, clothing retailer, or clothing manufacturer to server (100).

The server (100) can receive these user potential clothing purchases, and also receive other information, such as social network fashion preferences (e.g. the preferences of at least one different social network linked contact) pertaining to this user potential clothing purchase. This can help users make informed purchases for themselves, and for others as gifts.

Thus system can, in some embodiments, make use of a potential purchase scoring algorithm. This algorithm may operate according to a function of the social network fashion preferences to give feedback (to the user) on the merit of a user potential clothing purchase.

Thus, using FIG. 1 as an example, if the user of device (112) is shopping for a pink blouse, and the server (100) and database (102) know (by their record of the wardrobe items of users 114, 116, and 118 in the same social group) that no one owns any pink blouses, then the system may automatically warn user (112) that pink as a color is not favored by social group (110).

Depending upon system settings, the user (112) may choose to tell the server to also take data from certain other groups (e.g. groups 120 or 130) (e.g. the fashion super group comprised of other groups with similar fashion taste) into account as well. The user can optionally adjust the weight given to input from these other groups. Thus for example, if pink is not favored by the local group, but perhaps is favored by other well regarded groups in the fashion super group (perhaps by certain trendsetter groups), then the user might decide to disregard the consensus of the local group in favor of the consensus of other trendsetter groups.

Similarly if user (118) is shopping for a gift for user (112), and picks short black pants, the system may analyze user (112)'s wardrobe and warn user (118) that although user (112) has various black items, user (112) does not own any short pants, and this item may be a risky gift.

To further elaborate, in some embodiments, the system may further use its knowledge about wardrobe items associated with the user's various different social network linked contacts (e.g. at least members of the user's social network group), as well as the user's own wardrobe items and fashion preferences, to determine if there are any popular wardrobe items that the user does not presently own. The system may then recommend these to either the user (as a potential purchase) or to other members of the user's social network group (as a potential gift).

Making fashion recommendations based on local weather or calendar "special event" considerations:

In some embodiments, server (110) may be configured to further receive information pertaining to a present or future location of a user, as well as the anticipated weather conditions when the user is at this present or future location. The server can use this information in a more advanced type of scoring algorithm to make weather and location appropriate clothing recommendations. Here for example, the server can further analyze the user wardrobe items or outfits according to their weather suitability. This wardrobe item weather suitability may have been previously entered into the wardrobe item database by user input (e.g. the user tells the server which wardrobe items are best suited to which weather conditions). Alternatively the weather suitability of a given wardrobe item may have been automatically determined by the server using information from other item data fields such as the item name (e.g. "raincoat", "light jacket"), or item materials (e.g. plastic, cotton, leather, suede). As yet another method, when the wardrobe item is linked to a specific clothing supplier, then the clothing supplier's own assessment of that wardrobe item's weather suitability may be automatically imported into server database (102) and used for these purposes.

In either event, once the weather suitability of the various wardrobe items, and the user weather conditions are known, the system can then adjust its scoring algorithm to also consider (or weight) the weather suitability of the various wardrobe items or outfits. This way the system will be less likely to recommend shorts in subzero weather conditions, or heavy jackets during hot summer days, and so on. Instead the system will try to make weather appropriate fashion optimized recommendations.

Similarly it is often useful to have the system further optimize its fashion recommendations according to the type of occasion (e.g. formal, informal, type of occasion, and so on). Here the server (100) will typically be configured to receive information pertaining to at least one event type that the user is attending or planning to attend. The server and associated database (102) should further be configured so that at least the user, and/or the clothing supplier (when identified) can further identify the various wardrobe items as to event type (e.g. occasion such as formal, informal, sport, dance, beach, etc.). The server (100) can then further analyze the various user wardrobe items or outfits according the event type, and as a result thus further rank the various wardrobe items or outfits by as to how suitable they are for any given occasion (event). The scoring algorithm can thus take this occasion (event0 suitability ranking into account as well, and as a result, can make event appropriate fashion optimized recommendations as well.

In some cases, these various occasions or events may fall onto a predictable calendar schedule. These occasions or events may be common holidays such as Valentine's Day (where a red color is often appropriate), Saint Patrick's day (where traditionally at least one item should be green), and so on, as well as various user determined calendar settings. Here the server (100) and database (102) can be configured to receive calendar information pertaining to the calendar scheduling of the at least one event types, and the characteristics of the clothing most suitable (or unsuitable) for these event types. The server (100) and system can then use this calendar information to make calendar occasion optimized fashion recommendations as well. Thus the system may automatically remind the user to wear a green wardrobe item on Saint Patrick's Day every year, even if the user might otherwise forget.

Figure 10:
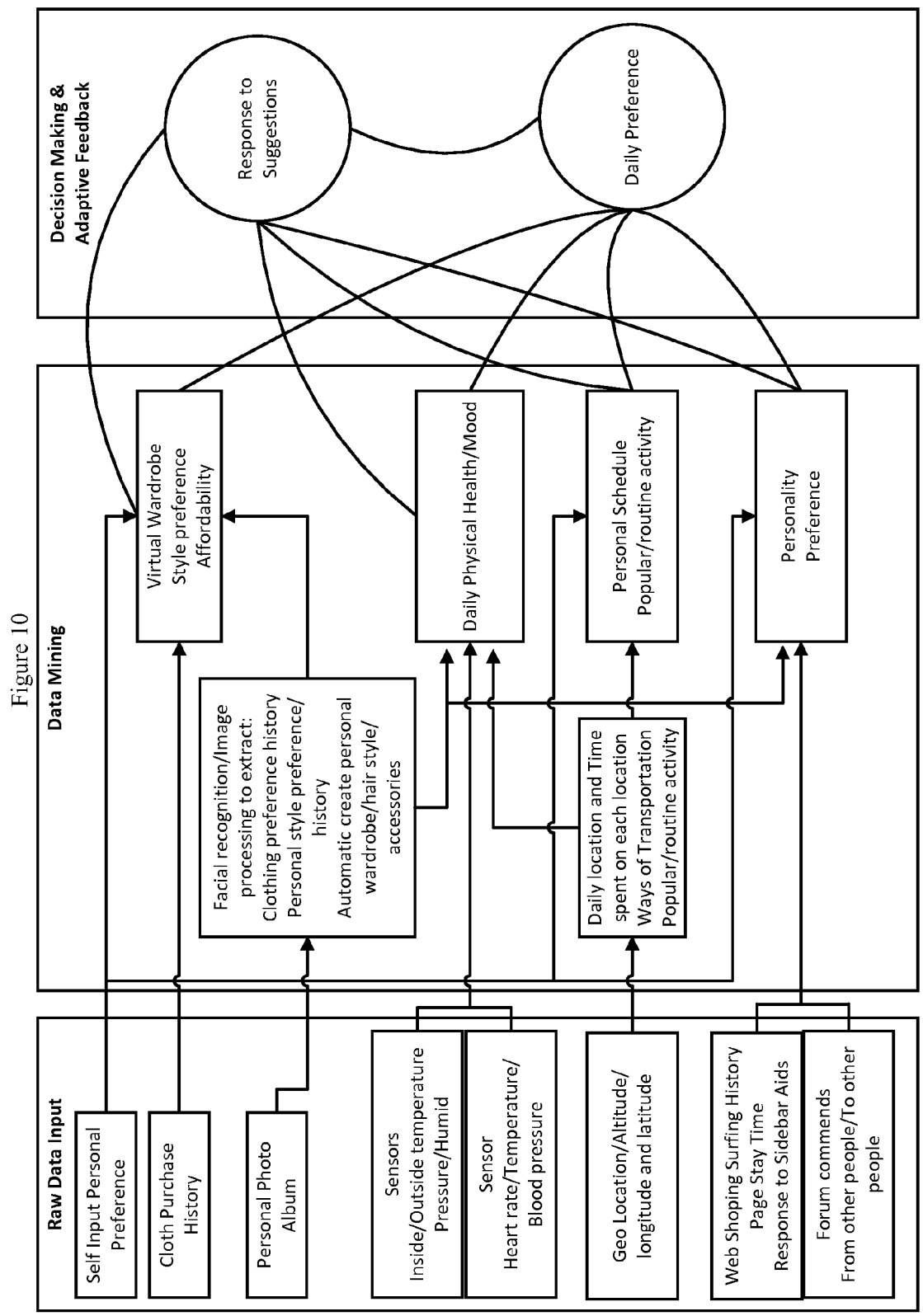
FIG. 10 further shows that in some embodiments the scoring algorithm can also integrate raw data from multiple sources, including sources outside of the social network. The system can also do various types of automated data mining, and in turn use this information to guide the scoring algorithm.

Various other scoring algorithm methods are also possible. FIG. 10 further shows that in some embodiments the scoring algorithm can also integrate raw data from multiple sources, including sources outside of the social network, do various types of data mining, and in turn use this information to further guide the scoring algorithm.

The invention claimed is:

1. A client-server social-network method for providing automated clothing suggestions for clothing presently owned by users of said social-network, said method comprising:

using at least one server comprising at least one processor, memory, fashion social network software, and a network connection to the internet to provide a fashion social network comprising a plurality of users, and a database configured to store, on a per user basis, user clothing information, user fashion preferences, user social network linkages, and social network fashion preferences;

further arranging said users in groups with similar fashion taste, said similar fashion taste established by at least one of group selection of members with similar fashion taste and automated fashion quizzes to ensure that said groups have similar fashion tastes;

said user clothing information comprising user wardrobe items for clothing presently owned by said user, each user wardrobe item further comprising item type, item color, item style, item image, and item history information;

said at least one server further configured to receive information pertaining to said user clothing information, user fashion preferences, and user friend information from at least one client computerized device, and store said user clothing information and user fashion preferences and user friend information in said database;

wherein said client computerized device comprises at least one processor, memory, and a display, and wherein said client computerized device uses fashion client software to send and receive information from both said at least one server and said user;

wherein said client computerized device is a smartphone or tablet device further comprising a camera, wherein said display is a touch sensitive display, and wherein said fashion client software is a downloadable app;

further using said client computerized device to photograph at least one of said wardrobe items, thereby producing wardrobe item images, and uploading said wardrobe item images to said server;

further generating a template of at least one wardrobe item on said display, and instructing said user to use said template to as a photographic guide while photographing said wardrobe item, thereby producing template delineated images;

and using only portions of said template delineated images that fall inside of said template for said wardrobe item images;

using said at least one server and said user friend information to establish social network linkages between said plurality of users, thereby establishing user social networks;

further receiving, on a per user basis, social network fashion preferences from said user social network, said social network fashion preferences comprising preferences of at least one different social network linked contact pertaining to at least one user wardrobe item, or at least one outfit comprising a plurality of user wardrobe items;

wherein said at least one server uses said user clothing information, user fashion preferences, said social network fashion preferences and a scoring algorithm to suggest at least one user wardrobe item, or at least one outfit, for said user to wear;

wherein said scoring algorithm gives weighting to user wardrobe items or outfits according to a function of said social network fashion preferences, said user fashion preferences, and said item history information;

further receiving information pertaining to an actual choice of said user, at a given time, of at least one user wardrobe item or at least one outfit and storing said actual choice and time in said database, and using said actual choice as at least part of said user fashion preferences;

further receiving a present or reported future locations of said user and at least some individuals in at least said user's social network;

determining if said present or reported future locations of said user and at least some individuals in at least said user's social network are within a given location criteria;

and if said present or reported future locations of said user and at least some individuals in at least said user's social network are within said given location matching criteria, performing any of:

a) receiving information pertaining to wardrobe items or outfits that said user and at least some individuals in said at least said user's social network are wearing or plan to wear, and providing a collision warning if at least some of said item styles or item colors are either similar or identical;

b) receiving information pertaining to wardrobe items or outfits that said user and at least some individuals in said at least said user's social network are wearing or plan to wear, and providing data reporting on which specific wardrobe items, item styles or item colors are either similar or identical.

2. The method of claim 1, further sorting said user wardrobe items or said outfits according to any of said item types, item colors, item styles, item history information, user fashion preferences, and social network fashion preferences, producing sorted user wardrobe items or sorted user outfits, and using said item images to display said sorted user wardrobe items or said sorted user outfits on said at least one client computerized device; and further displaying said sorted user wardrobe items or said sorted user outfits on a 3-dimensional virtual mannequin using least one client computerized device; or further uploading images of said user to said at least one server, and using said images of said user to customize an appearance of said 3-dimensional virtual mannequin to resemble said images of said user, thereby producing a customized 3-dimensional virtual mannequin, and further displaying said sorted user wardrobe items or said sorted user outfits on said customized 3-dimensional virtual mannequin using said least one client computerized device.

3. The method of claim 2, further uploading background images or a link to a dynamic background for said 3-dimensional virtual mannequin to said at least one server, and further displaying said sorted user wardrobe items or said sorted user outfits on said customized 3-dimensional virtual mannequin against said background images or dynamic background.

4. The method of claim 1, either allowing members of said user social networks to vote on which member has a best fashion sense, and reporting these results; or scoring mutual social network fashion preferences among members of said user social network, and automatically ranking a plurality of members according to their overall cumulative fashion sense score;

further providing fashion games methods, said fashion games methods being at least one of:

a) using a plurality of client computerized devices equipped with accelerometers or buttons to determine which said users are presently activating their client computerized devices by shaking or pressing at least one of said buttons; and for all users with presently activated client computerized devices, sharing information pertaining to said user wardrobe items;

b) receiving, from said users, guesses at what other members of said user's social networks are wearing, and reporting on a score of an accuracy of said guesses;

c) providing a virtual fashion carnival by inviting a plurality of other members to exhibit their clothing selections as either user wardrobe items, user outfits, or customized virtual mannequins, providing access to said virtual fashion carnival to viewers comprising either members of said user's social network or members of said social network and individuals outside of said user's social network, and receiving fashion rating votes from at least some of said viewers;

wherein said fashion rating votes are added to said member's said overall cumulative fashion sense score.

5. A client-server social-network method for providing automated clothing suggestions for clothing presently owned by users of said social-network, said method comprising:

using at least one server comprising at least one processor, memory, fashion social network software, and a network connection to the internet to provide a fashion social network comprising a plurality of users, and a database configured to store, on a per user basis, user clothing information, user fashion preferences, user social network linkages, and social network fashion preferences;

further arranging said users in groups with similar fashion taste, said similar fashion taste established by at least one of group selection of members with similar fashion taste and automated fashion quizzes to ensure that said groups have similar fashion tastes;

said user clothing information comprising user wardrobe items for clothing presently owned by said user, each user wardrobe item further comprising item type, item color, item style, item image, and item history information;

said at least one server further configured to receive information pertaining to said user clothing information, user fashion preferences, and user friend information from at least one client computerized device, and store said user clothing information and user fashion preferences and user friend information in said database;

wherein said client computerized device comprises at least one processor, memory, and a display, and wherein said client computerized device uses fashion client software to send and receive information from both said at least one server and said user;

wherein said client computerized device is a smartphone or tablet device further comprising a camera, wherein said display is a touch sensitive display, and wherein said fashion client software is a downloadable app;

further using said client computerized device to photograph at least one of said wardrobe items, thereby producing wardrobe item images, and uploading said wardrobe item images to said server;

using said at least one server and said user friend information to establish social network linkages between said plurality of users, thereby establishing user social networks;

further receiving, on a per user basis, social network fashion preferences from said user social network, said social network fashion preferences comprising preferences of at least one different social network linked contact pertaining to at least one user wardrobe item, or at least one outfit comprising a plurality of user wardrobe items;

wherein said at least one server uses said user clothing information, user fashion preferences, said social network fashion preferences and a scoring algorithm to suggest at least one user wardrobe item, or at least one outfit, for said user to wear;

wherein said scoring algorithm gives weighting to user wardrobe items or outfits according to a function of said social network fashion preferences, said user fashion preferences, and said item history information;

further receiving information pertaining to an actual choice of said user, at a given time, of at least one user wardrobe item or at least one outfit and storing said actual choice and time in said database, and using said actual choice as at least part of said user fashion preferences;

further sorting said user wardrobe items or said outfits according to any of said item types, item colors, item styles, item history information, user fashion preferences, and social network fashion preferences, producing sorted user wardrobe items or sorted user outfits, and using said item images to display said sorted user wardrobe items or said sorted user outfits on said at least one client computerized device;

further displaying said sorted user wardrobe items or said sorted user outfits on a 3-dimensional virtual mannequin using least one client computerized device; or further uploading images of said user to said at least one server, and using said images of said user to customize an appearance of said 3-dimensional virtual mannequin to resemble said images of said user, thereby producing a customized 3-dimensional virtual mannequin, and further displaying said sorted user wardrobe items or said sorted user outfits on said customized 3-dimensional virtual mannequin using said least one client computerized device;

further receiving a present or reported future locations of said user and at least some individuals in at least said user's social network;

determining if said present or reported future locations of said user and at least some individuals in at least said user's social network are within a given location criteria;

and if said present or reported future locations of said user and at least some individuals in at least said user's social network are within said given location matching criteria, performing any of:

a) receiving information pertaining to wardrobe items or outfits that said user and at least some individuals in said at least said user's social network are wearing or plan to wear, and providing a collision warning if at least some of said item styles or item colors are either similar or identical;

b) receiving information pertaining to wardrobe items or outfits that said user and at least some individuals in said at least said user's social network are wearing or plan to wear, and providing data reporting on which specific wardrobe items, item styles or item colors are either similar or identical;

either allowing members of said user social networks to vote on which member has a best fashion sense, and reporting these results; or scoring mutual social network fashion preferences among members of said user social network, and automatically ranking a plurality of members according to their overall cumulative fashion sense score;

further providing fashion games methods, said fashion games methods being at least one of:

a) using a plurality of client computerized devices equipped with accelerometers or buttons to determine which said users are presently activating their client computerized devices by shaking or pressing at least one of said buttons; and for all users with presently activated client computerized devices, sharing information pertaining to said user wardrobe items;

b) receiving, from said users, guesses at what other members of said user's social networks are wearing, and reporting on a score of an accuracy of said guesses;

c) providing a virtual fashion carnival by inviting a plurality of other members to exhibit their clothing selections as either user wardrobe items, user outfits, or customized virtual mannequins, providing access to said virtual fashion carnival to viewers comprising either members of said user's social network or members of said social network and individuals outside of said user's social network, and receiving fashion rating votes from at least some of said viewers;

wherein said fashion rating votes are added to said member's said overall cumulative fashion sense score.

6. The method of claim 5, further uploading background images or a link to a dynamic background for said 3-dimensional virtual mannequin to said at least one server, and further displaying said sorted user wardrobe items or said sorted user outfits on said customized 3-dimensional virtual mannequin against said background images or dynamic background.

7. The method of claim 5, further generating a template of at least one item on said display screen, and instructing said user to use said template to as a photographic guide while photographing said item, thereby producing template delineated images;

and using only portions of said template delineated images that fall inside of said template for said item images.

8. The method of claim 5, further providing an advice exchange forum for all users, wherein said all users may direct questions to either all users, specific users, or users with a specified overall cumulative fashion preference score;

and wherein any answers may be directed to either all users, specific users, or the user who submitted the question;

and wherein said user who submitted the question may rank the quality of said answer according to a quality score, thus awarding answer points to the answering user who submitted said answers;

and wherein said server awards prizes to answering users with high cumulative answer points.

* * * * *